US006862731B1

(12) United States Patent
Roth et al.

(10) Patent No.: US 6,862,731 B1
(45) Date of Patent: Mar. 1, 2005

(54) NET ZEROING FOR EFFICIENT PARTITION AND DISTRIBUTION

(75) Inventors: Tova Roth, Woodmere, NY (US); Vadakkedathu T. Rajan, Briarcliff Manor, NY (US); Douglas N. Kimelman, Yorktown Heights, NY (US); Mark N. Wegman, Ossining, NY (US); Karin Hogstedt, Chester, NJ (US)

(73) Assignee: International Business Machines Corp., Armonk, NY (US)

( * ) Notice: Subject to any disclaimer, the term of this patent is extended or adjusted under 35 U.S.C. 154(b) by 852 days.

(21) Appl. No.: 09/676,425

(22) Filed: Sep. 29, 2000

(51) Int. Cl.[7] .......................... G06F 9/46; G06F 15/173
(52) U.S. Cl. ..................... 718/100; 718/102; 709/226; 719/310
(58) Field of Search ............................... 709/200, 223, 709/226; 718/100, 102; 719/310

(56) References Cited

U.S. PATENT DOCUMENTS

| 6,266,053 B1 | * | 7/2001 | French et al. | ............ 715/500.1 |
| 6,437,804 B1 | * | 8/2002 | Ibe et al. | .................... 345/736 |
| 6,629,123 B1 | * | 9/2003 | Hunt | ......................... 718/106 |

OTHER PUBLICATIONS

M. Padberg et al., "An Efficient Algorithm For The Minimum Capacity Cut Problem", *Mathematical Programming* 47 (1990) pps. 19–36 North–Holland.

E. Dahlhaus et al., "The Complexity of Multiterminal Cuts", 1994 Society for Industrial and Applied Mathematics, pps. 864–894.

* cited by examiner

Primary Examiner—Meng-Al T. An
Assistant Examiner—Syed Ali
(74) Attorney, Agent, or Firm—Law Office of Charles W. Peterson, Jr.; Louis P. Herzberg

(57) ABSTRACT

The present invention is a task management system, method and computer program product for determining optimal placement of task components on multiple machines for task execution, particularly for placing program components on multiple computers for distributed processing. First, a communication graph is generated representative of the computer program with each program unit (e.g., an object) represented as a node in the graph. Nodes are connected to other nodes by edges representative of communication between connected nodes. A weight is applied to each edge, the weight being a measure of the level of communication between the connected edges. Terminal nodes representative of ones of the multiple computers are attached to the communication graph. Independent nets may be separated out of the communication graph. For each net, non-terminal nodes adjacent to all of terminal nodes on the net and connected to the net by non-zero weighted edges are identified For each identified non-terminal node, the smallest weight for any terminal edge is identified and the weight of each terminal edge is reduced by the value of that smallest weight, the weight of terminal edges having the smallest weight being reduced to zero. After reducing weights on any terminal edges, The min cut solution is obtained from the reduced graph and program components, which may be a single program unit or an aggregate of units, are placed on computers according to the communication graph min cut solution.

18 Claims, 6 Drawing Sheets

NET ZEROING FOR EFFICIENT PARTITION AND DISTRIBUTION

RELATED APPLICATION

The present application is related to U.S. patent application Ser. No. 09/676,422 entitled "INDEPENDENT NET TASK IDENTIFICATION FOR EFFICIENT PARTITION AND DISTRIBUTION" to Kimelman et al.; U.S. patent application Ser. No. 09/676,423 entitled "MACHINE CUT TASK IDENTIFICATION FOR EFFICIENT PARTITION AND DISTRIBUTION" to Rajan et al.; and U.S. patent application Ser. No. 09/676,424 entitled "DOMINANT EDGE IDENTIFICATION FOR EFFICIENT PARTITION AND DISTRIBUTION" to Wegman et al., all filed coincident herewith and assigned to the assignee of the present invention.

BACKGROUND OF THE INVENTION

1. Field of the Invention

The present invention generally relates to distributed processing and more particularly, the present invention relates to efficiently assigning tasks across multiple computers for distributed processing.

2. Background Description

Any large, multifaceted project, such as a complex computer program, may be segmented into multiple smaller manageable tasks. The tasks then may be distributed amongst a group of individuals for independent completion, e.g., an engineering design project, distributed processing or, the layout of a complex electrical circuit such as a microprocessor. Ideally, the tasks are matched with the skills of the assigned individual and each task is completed with the same effort level as every other task. However, with such an ideal matched task assignment, intertask communication can become a bottleneck to project execution and completion. Thus, to minimize this potential bottleneck, it is important to cluster together individual tasks having the highest level of communication with each other. So, for example, in distributing eight equivalent tasks to pairs of individuals at four locations, (e.g., eight design engineers in four rooms) optimally, pairs of objects or tasks with the highest communication rate with each other are assigned to individual pairs at each of the four locations.

Many state of the art computer applications are, by nature, distributed applications. End-users sit at desktop workstations or employ palmtop information appliances on the run, while the data they need to access resides on distant data servers, perhaps separated from these end-users by a number of network tiers. Transaction processing applications manipulate data spread across multiple servers. Scheduling applications are run on a number of machines that are spread across the companies of a supply chain, etc.

When a large computer program is partitioned or segmented into modular components and the segmented components are distributed over two or more machines, for the above mentioned reasons, component placement can have a significant impact on program performance. Therefore, efficiently managing distributed programs is a major challenge, especially when components are distributed over a network of remotely connected computers. Further, existing distributed processing management software is based on the assumption that the program installer can best decide how to partition the program and where to assign various program components. However, experience has shown that programmers often do a poor job of partitioning and component assignment.

So, a fundamental problem facing distributed application developers is application partitioning and component or object placement. Since communication cost may be the dominant factor constraining the performance of a distributed program, minimizing inter-system communication is one segmentation and placement objective. Especially when placement involves three or more machines, prior art placement solutions can quickly become unusable, i.e., what is known as NP-hard. Consequently, for technologies such as large application frameworks and code generators that are prevalent in object-oriented programming, programmers currently have little hope of determining effective object placement without some form of automated assistance. En masse inheritance from towering class hierarchies, and generation of expansive object structures leaves programmers with little chance of success in deciding on effective partitioning. This is particularly true since current placement decisions are based solely on the classes that are written to specialize the framework or to augment the generated application.

Furthermore, factors such as fine object granularity, the dynamic nature of object-based systems, object caching, object replication, ubiquitous availability of surrogate system objects on every machine, the use of factory and command patterns, etc., all make partitioning in an object-oriented domain even more difficult. In particular, for conventional graph-based approaches to partitioning distributed applications, fine-grained object structuring leads to enormous graphs that may render these partitioning approaches impractical.

Finally, although there has been significant progress in developing middleware and in providing mechanisms that permit objects to inter-operate across language and machine boundaries, there continues to be little to help programmers decide object-system placement. Using state of the art management systems, it is relatively straightforward for objects on one machine to invoke methods on objects on another machine as part of a distributed application. However, these state of the art systems provide no help in determining which objects should be placed on which machine in order to achieve acceptable performance. Consequently, the initial performance of distributed object applications often is terribly disappointing. Improving on this initial placement performance is a difficult and time-consuming task.

Accordingly, there is a need for a way of automatically determining the optimal program segmentation and placement of distributed processing components to minimize communication between participating distributed processing machines.

SUMMARY OF THE INVENTION

It is therefore a purpose of the present invention to improve distributed processing performance;

It is another purpose of the present invention to minimize communication between distributed processing machines;

It is yet another purpose of the invention to improve object placement in distributed processing applications;

It is yet another purpose of the invention to determine automatically how objects should best be distributed in distributed processing applications it is yet another purpose of the invention to minimize communication between objects distributed amongst multiple computers in distributed processing applications.

The present invention is a task management system, method and computer program product for determining optimal placement of task components on multiple machines for task execution, particularly for placing program components on multiple computers for distributed processing. First, a communication graph is generated representative of the computer program with each program unit (e.g., an object) represented as a node in the graph. Nodes are connected to other nodes by edges representative of communication between connected nodes. A weight is applied to each edge, the weight being a measure of the level of communication between the connected edges. Terminal nodes representative of ones of the multiple computers are attached to the communication graph. Independent nets may be separated out of the communication graph. For each net, non-terminal nodes adjacent to all of terminal nodes on the net and connected to the net by non-zero weighted edges are identified. For each identified non-terminal node, the smallest weight for any terminal edge is identified and the weight of each terminal edge is reduced by the value of that smallest weight, the weight of terminal edges having the smallest weight being reduced to zero. After reducing weights on any terminal edges, The min cut solution is obtained from the reduced graph and program components, which may be a single program unit or an aggregate of units, are placed on computers according to the communication graph min cut solution.

BRIEF DESCRIPTION OF THE DRAWINGS

The foregoing and other objects, aspects and advantages will be better understood from the following detailed preferred embodiment description with reference to the drawings, in which.

DETAILED DESCRIPTION OF PREFERRED EMBODIMENTS OF THE INVENTION

As referred to herein, a communication graph is a graphical representation of a multifaceted task such as a computer program. Each facet of the task is an independent task or object that is represented as a node and communication between tasks or nodes is represented by a line (referred to as an edge) between respective communicating nodes. Participating individuals (individuals receiving and executing distributed tasks) are referred to as terminal nodes or machine nodes. A net is a collection of nodes connected together by edges. Two nets are independent if none of the non-terminal nodes of one net shares an edge with a non-terminal node of the other. Thus, for example, a communication graph of a computer program might include a node for each program object and edges would be between communicating objects, with edges not being included between objects not communicating with each other. In addition, a weight, indicative of the level of communication between the nodes may be assigned to each edge. Graphical representation and modeling of computer programs is well known in the art.

Figure 1:
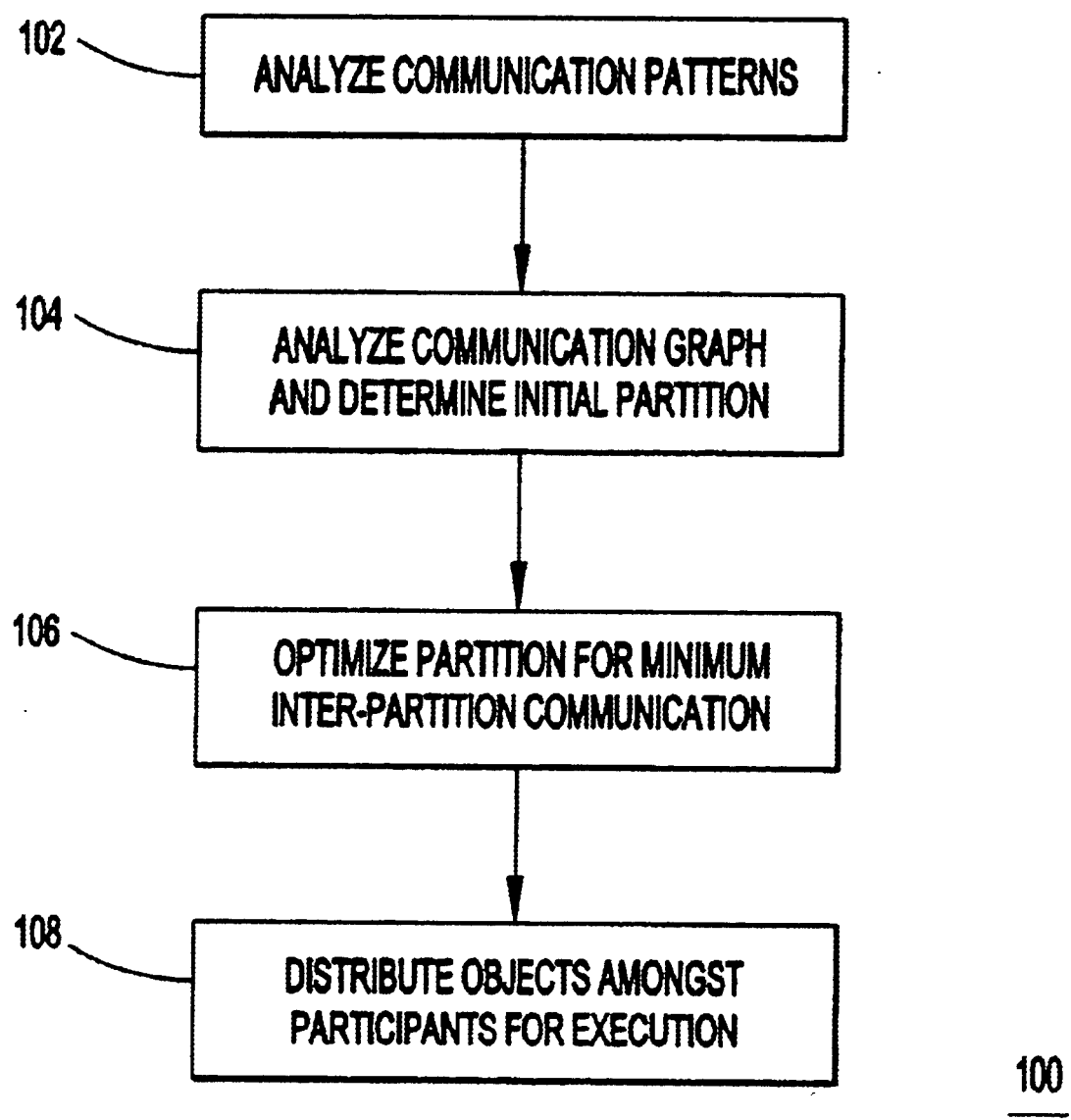
FIG. 1 shows an example of a flow diagram of the preferred embodiment of the present invention wherein a program is segmented, initially, and initial segments are distributed to and executed on multiple computers.

Referring now to the drawings, and more particularly, FIG. 1 is an example of a flow diagram 100 of the preferred embodiment of the present invention wherein a program is segmented, initially, and initial segments are distributed to and executed on multiple computers. First, in step 102 the communication patterns of a program are analyzed to form a communication graph. Then, in step 104, the traces of the communication graph are analyzed, and an initial partition is determined. In step 106, the partition is optimized for minimum interpartition communication. In step 108, the individual objects are distributed amongst participants for execution according to the optimize partition of step 106.

A component refers to an independent unit of a running program that may be assigned to any participating individual, e.g., computers executing objects of a distributed program. Thus, a component may refer to an instance of an object in an object oriented program, a unit of a program such as Java Bean or Enterprise Java Bean or, a larger collection of program units or components that may be clustered together intentionally and placed on a single participating machine. Further, a program is segmented or partitioned into segments that each may be a single component or a collection of components. After segmenting, analyzing the segments and assigning each of segments or components to one of the multiple participating machines or computers according to the present invention, the final machine assignment is the optimal assignment.

Thus, a typical communication graph includes multiple nodes representative of components with weighted edges between communicating nodes. Determining communication between components during program execution may be done using a typical well known tool available for such determination. Appropriate communication determination tools include, for example, Jinsight, for Java applications that run on a single JVM, the Object Level Tracing (OLT) tool, for WebSphere applications or, the monitoring tool in Visual Age Generator.

Figure 2A:
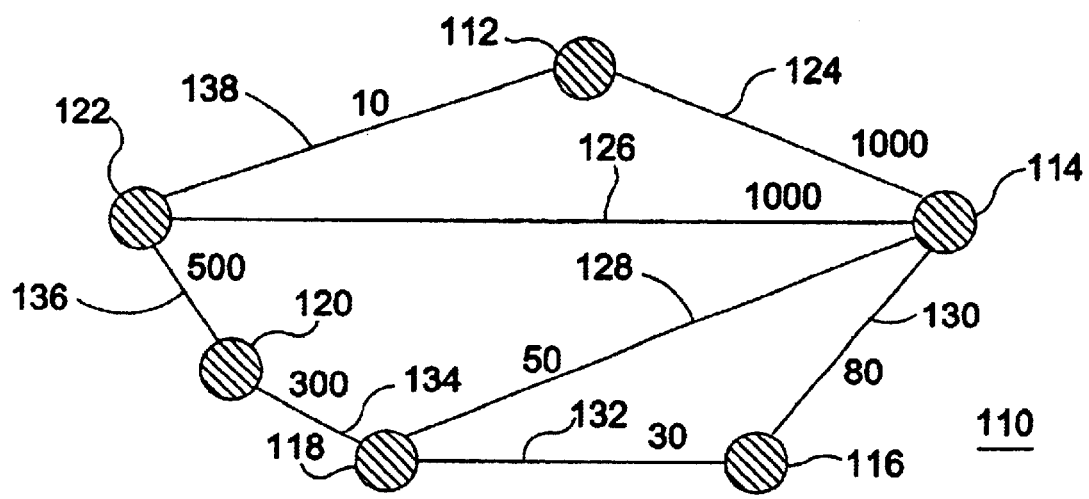
FIGS. 2A–C show an example of a communication graph.
Figure 2B:
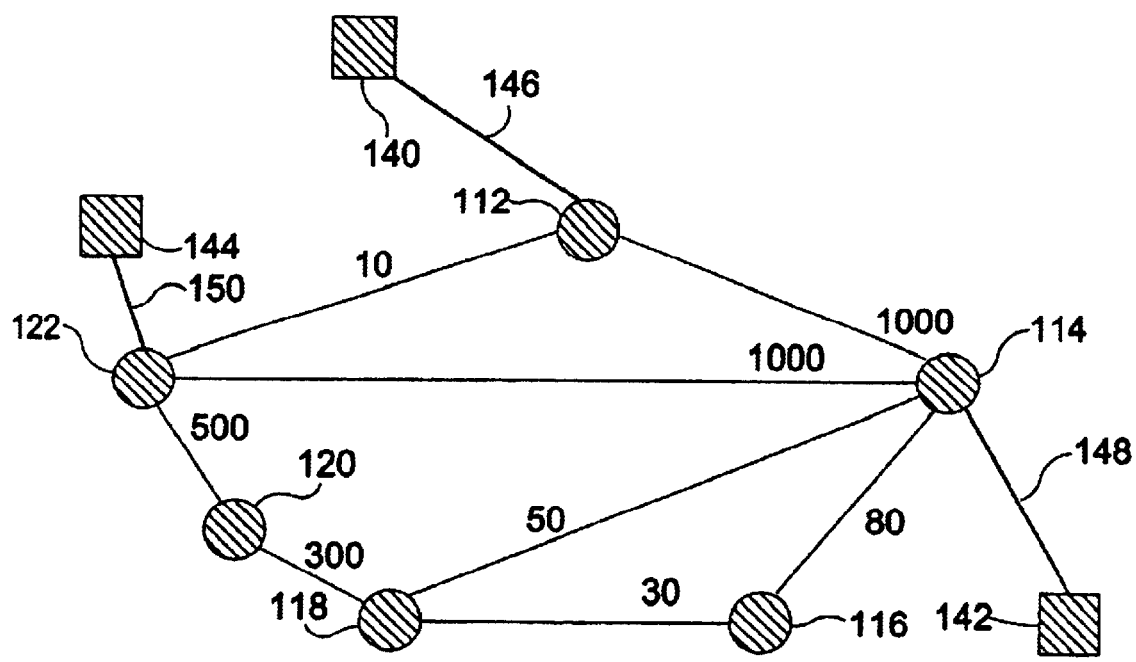
Figure 2C:
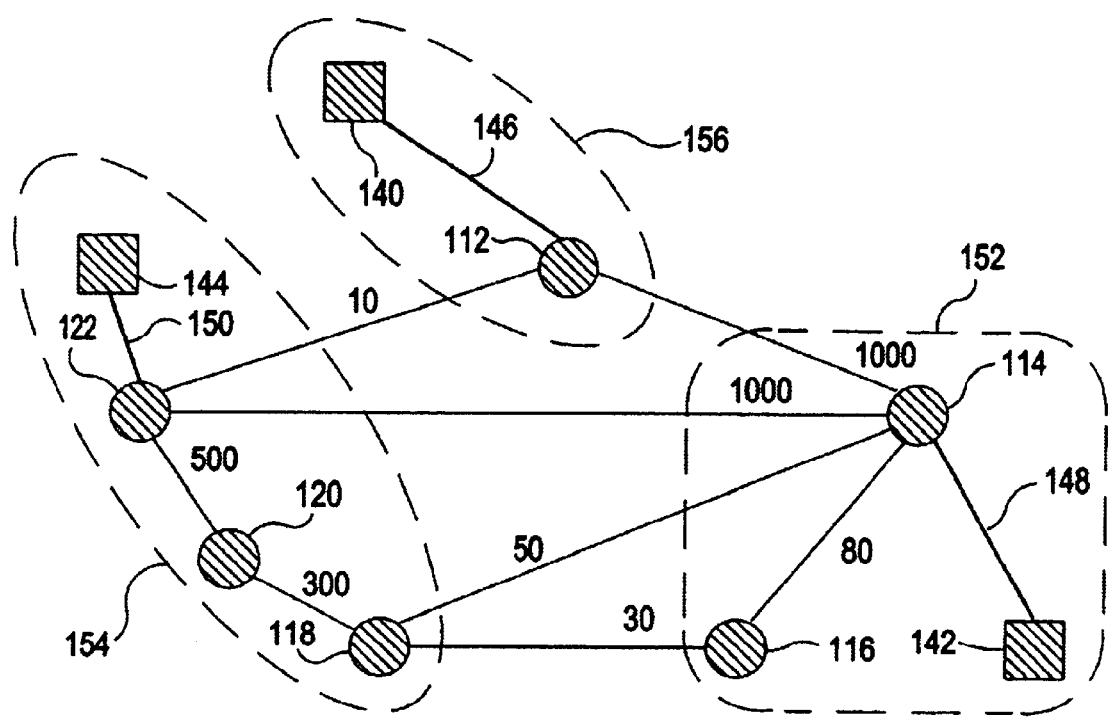

FIGS. 2A–C show an example of a communication graph of a net 110 that includes multiple nodes 112, 114, 116, 118, 120 and 122. Each node 112, 114, 116, 118, 120 and 122 represents a program component connected to communication edges 124, 126, 128, 130, 132, 134, 136 and 138 to form the net 110. Adjacent nodes are nodes that share a common edge, e.g., nodes 114 and 122 share edge 126. Each edge 124, 126, 128, 130, 132, 134, 136 and 138 has been assigned a weight proportional to, for example, the number of messages between the adjacent components.

In FIG. 2B, Machine nodes 140, 142 and 144 representative of each participating machine (three in this example) are shown connected by edges 146, 148, 150. Initially, a node 112, 114, 116, 118, 120 and 122 may be placed on a machine 140, 142, 144 by adding an edge 146, 148, 150 with infinite weight (indicating constant communication) between the node and the machine. Typically, initial assignment places nodes with specific functions (e.g., database management) on a machine suited for that function. After the initial placement assigning some nodes 112, 114 and 122 to machines 140, 142, 144, other nodes 116, 118, 120 are assigned to machines 140, 142, 144, if they communicate heavily with a node 112, 114, 122 already assigned to that machine 140, 142, 144. Additional assignment is effected by selectively collapsing edges, combining the nodes on either end of the collapsed edge and re-assigning edges that were attached to one of the two former adjacent nodes to the combined node. When assignment is complete, all of the nodes 112, 114, 116, 118, 120 and 122 will have been placed on one of the machines at terminal nodes 140, 142, 144 and the final communication graph may be represented as terminal nodes 140, 142, 144 connected together by communication edges.

For this subsequent assignment, the graph is segmented by cutting edges and assigning nodes to machines as represented by 152, 154 and 156 in FIG. 2C to achieve what is known in the art as a minimal cut set or min cut set. A cut set is a set of edges that, if removed, eliminate every path between a pair of terminal nodes (machine nodes) in the graph. A min cut set is a cut set wherein the sum of the weights of the cut set edges is minimum. While there may be more than one min cut set, the sum is identical for all min cut sets. A min cut may be represented as a line intersecting the edges of a min cut set. So, in the example of FIG. 2C, the sum of the weights of edges 124, 126, 128, 132 and 138 is 2090, which is cost of the cut and is representative of the total number of messages that would be sent between machines at terminal nodes 140, 142, 144 with this particular placement. The min cut identifies the optimum component placement with respect to component communication. While selecting a min cut set may be relatively easy for this simple example, it is known to increase in difficulty exponentially with the number of nodes in the graph.

Figure 3:
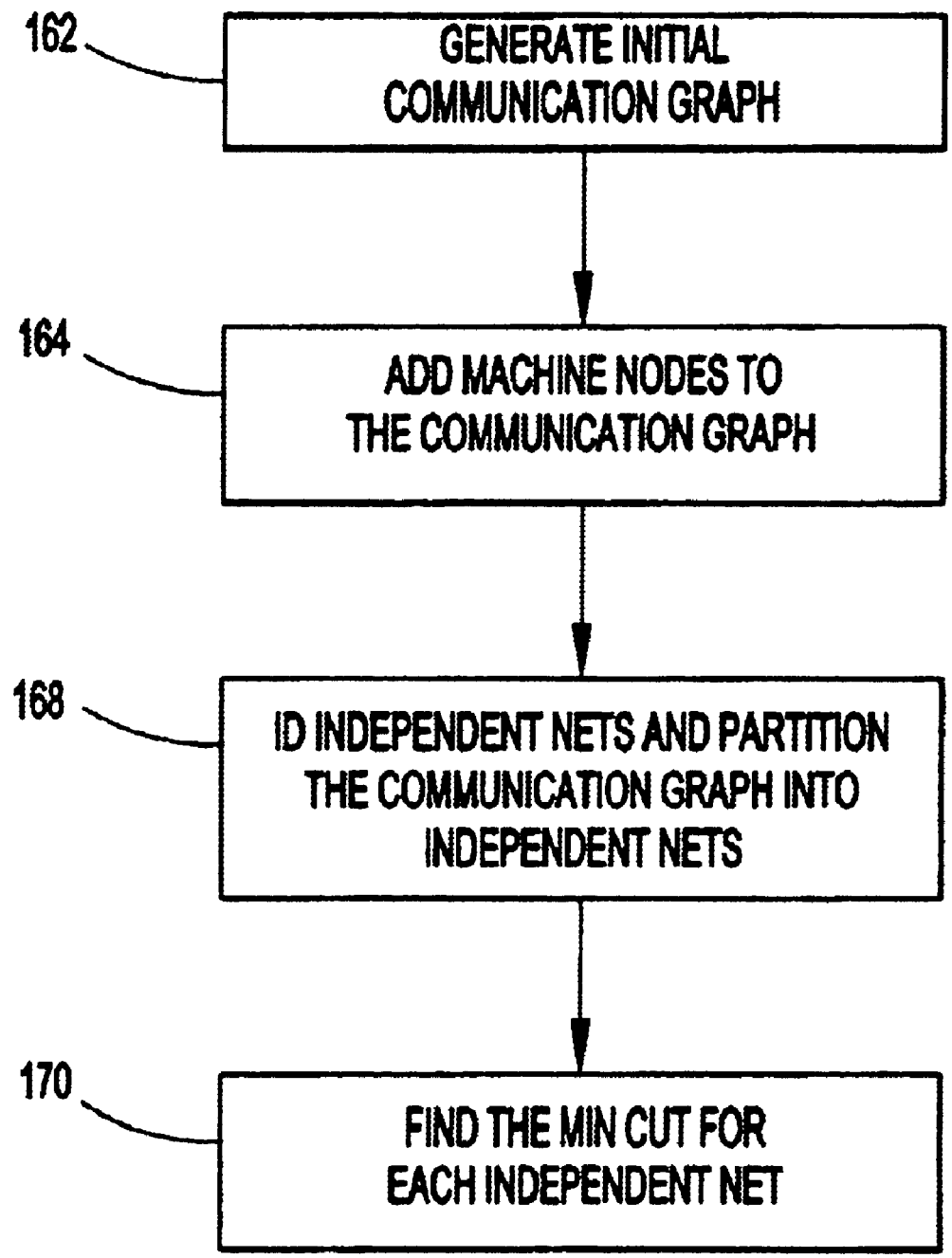
FIG. 3 is a flow diagram of the optimization steps for determining an optimum distribution of program components.

FIG. 3 is a flow diagram 160 of the optimization steps for determining an optimum distribution of program components to individual participating computers according to a preferred embodiment of the present invention. First, in step 162, an initial communication graph is generated for the program. Then, in step 164 machine nodes are added to the communication graph. As noted above certain types of components are designated, naturally, for specific host machine types, e.g., graphics components are designated for clients with graphics capability or, server components designated for a data base server. After assigning these host specific components, in step 168 independent nets are identified and the communication graph is partitioned into the identified independent nets as described in U.S. patent application Ser. No. 09/676,422 entitled "INDEPENDENT NET TASK IDENTIFICATION FOR EFFICIENT PARTITION AND DISTRIBUTION" to Kimelman et al., assigned to the assignee of the present invention and incorporated herein by reference. In step 170 a min cut solution is derived for each of the independent nets using the preferred embodiment Net Zeroing reduction method described hereinbelow to reduce the independent nets. The min cuts for all of the independent nets being the min cut for the whole communication graph. U.S. application Ser. No. 09/676,422 entitled "INDEPENDENT NET TASK IDENTIFICATION FOR EFFICIENT PARTITION AND DISTRIBUTION"to Kimelman et al.

Figure 4A:
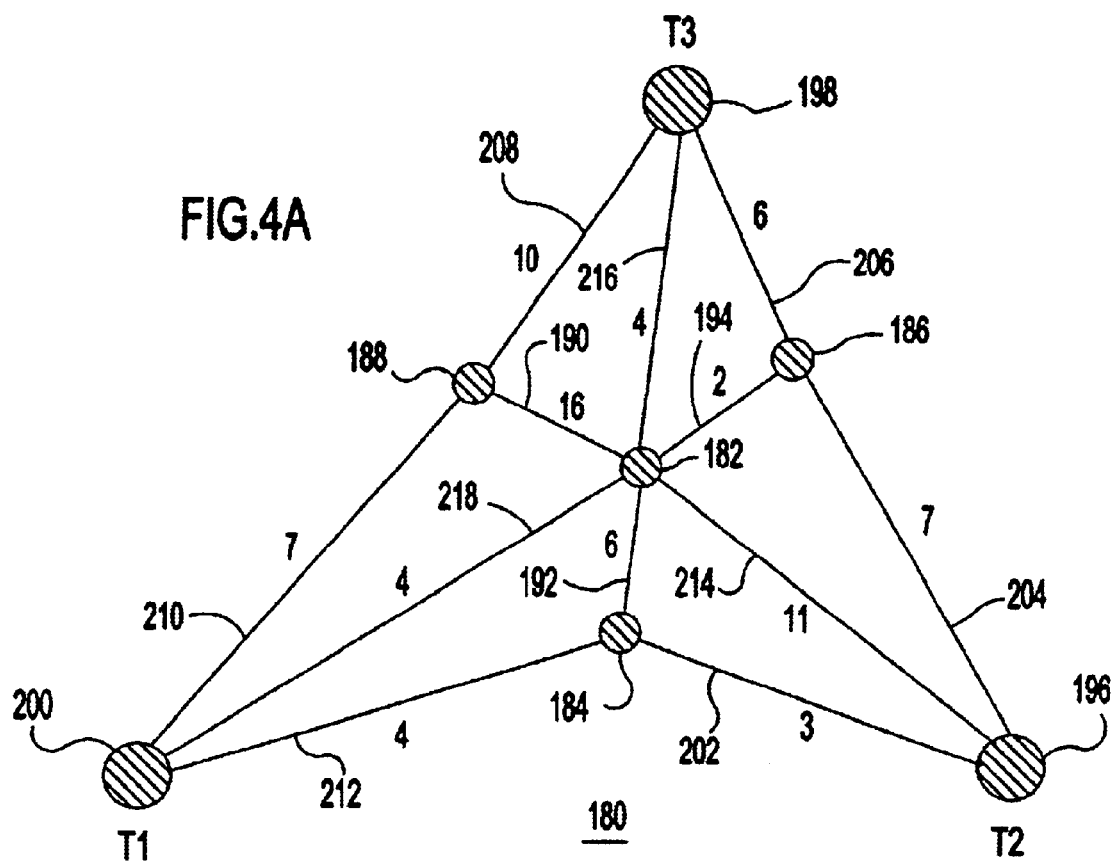
FIGS. 4A–B are an example of a simple communication graph reducible using Net Zeroing.
Figure 4B:
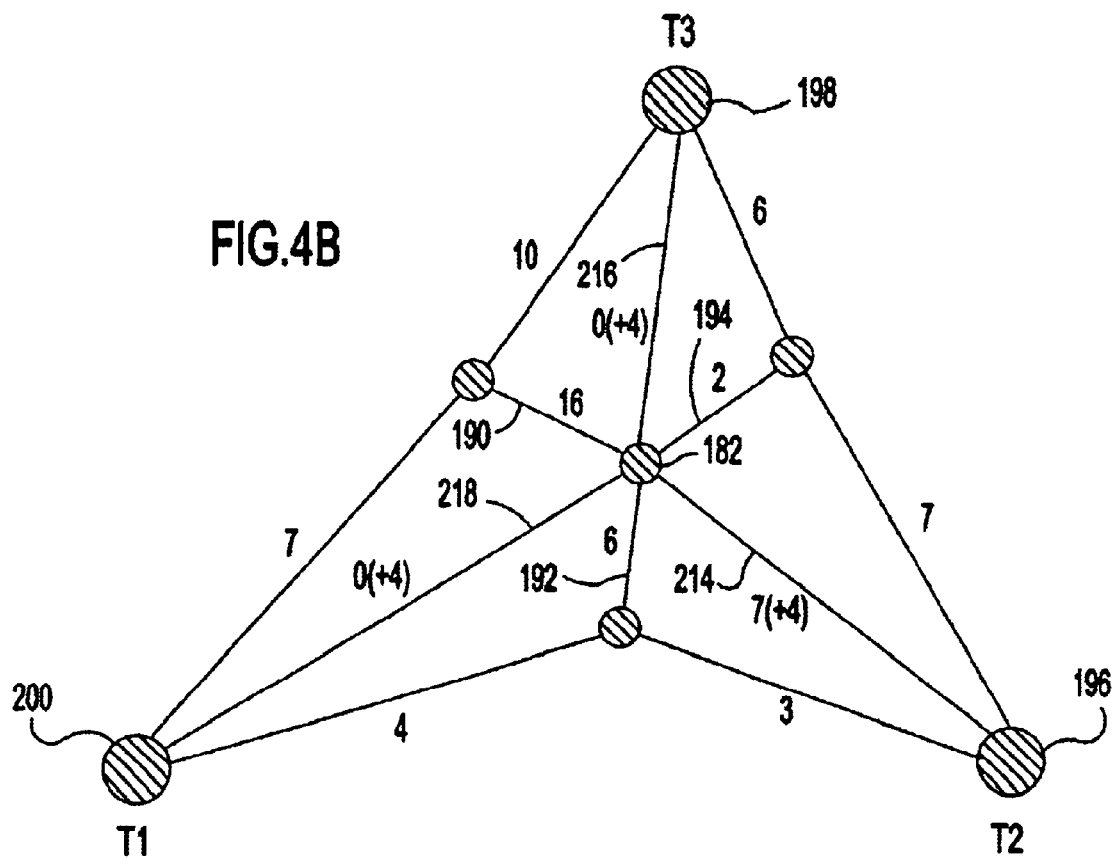

FIGS. 4A–B are an example of a simple communication graph 180 reducible using the preferred embodiment Net Zeroing method of the present invention. In this example, the graph 180 includes four (4) non-terminal nodes 182, 184, 186 and 188 connected together by edges 190, 192 and 194, referred to herein as non-terminal edges. Three (3) terminal nodes 196, 198 and 200 are connected to non-terminal nodes 184, 186 and 188 by edges 202, 204, 206, 208, 210 and 212. Non-terminal node 182 is connected to all three terminal nodes 196, 198 and 200 by edges 214, 216 and 218, respectively. Edges 202-214 are referred to herein as terminal edges.

A weight is represented as being attached to each edge 190–194 and 202–218. Essentially, Net Zeroing is applied to any node in a net that is adjacent (has a weight greater than zero) to all terminal nodes in the net, i.e., node 182 in this example. Net Zeroing reduces the weight of each terminal node attached to such a node by a value equal to the smallest terminal node weight. In this example, terminal edge 216 and 218 have the smallest terminal edge weight (4) of the terminal edges 214, 216 and 218 attached to node 182. So, in FIG. 4B, the weight attached to terminal edges 214, 216 and 218 is shown with each reduced by four. This decrease in edge weights affects all possible cuts equally, and thus has no effect on which edges are present in the multiway minimum cut solution. It does however, result in a net that is more amenable to finding the min cut solution (using, for example, the Dominant Edge heuristic). Thus, the graph has been reduced in the sense that it is has been simplified, making the min cut solution easier to find, much more quickly.

Figure 5:
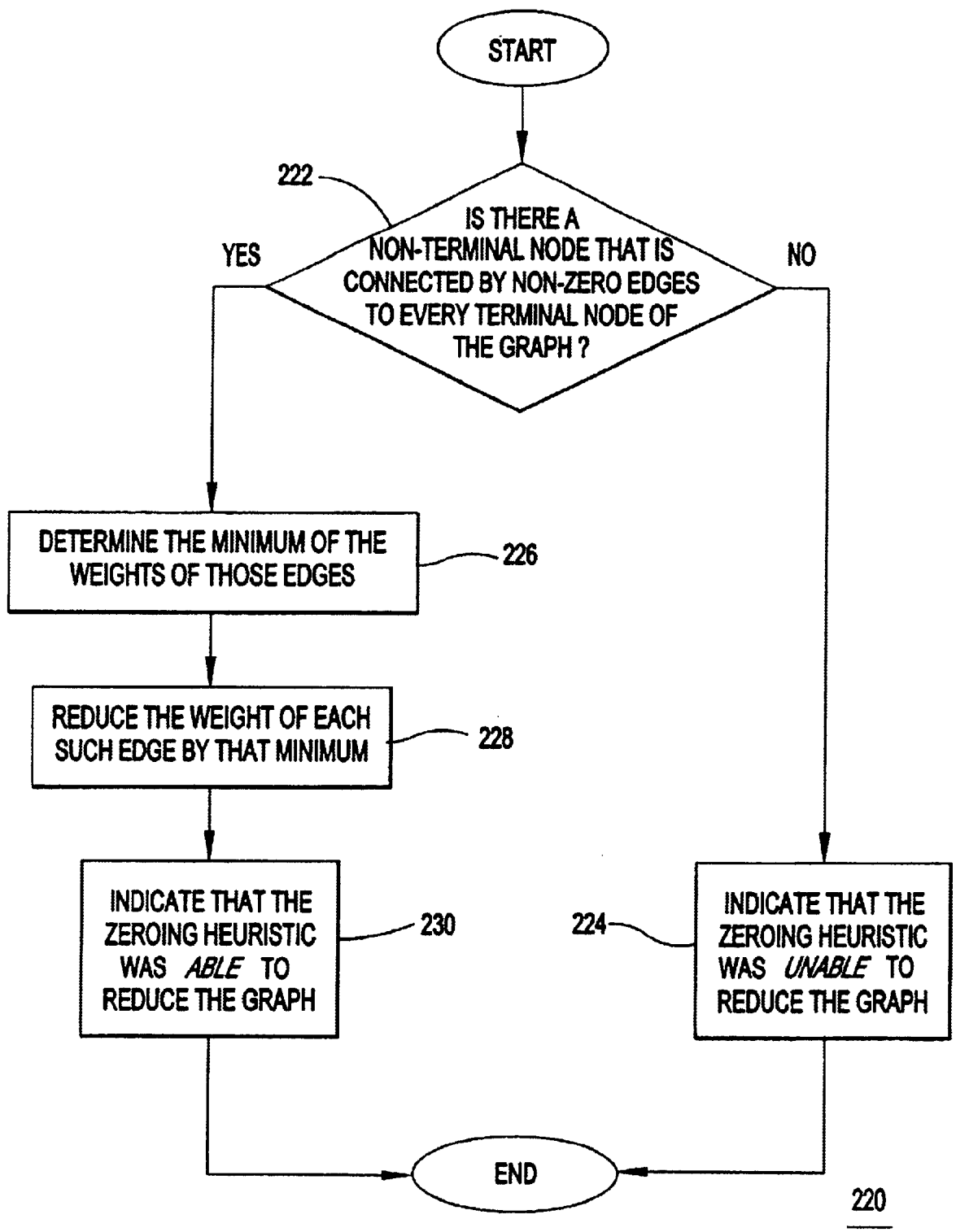
FIG. 5 shows an example of the Net Zeroing steps of the present invention.

FIG. 5 is an example of the Net Zeroing steps 220 of identifying terminal edges wherein weights are reduced according to the preferred embodiment of the present invention. First, in step 222, an independent net is checked to determine whether it includes any non-terminal nodes that are adjacent to all machine nodes connected to that net. Net Zeroing may be applied to any such identified non-terminal node wherein the weight of all connected non-terminal edges is greater than zero. It should be noted that the weight of one or more terminal edges may be zero as a result of a prior Net Zeroing application as in the example of FIG. 4B. If no non-terminal nodes are found adjacent to all terminals and connected thereto by terminal edges with weights that are all greater than zero, then in step 224 Net Zeroing is determined to be inapplicable to the net. Otherwise, in step 226, the minimum weight for the terminal edges is identified. In step 228, the weight of each of the non-terminal edges is reduced by the value of the minimum edge weight. It should be noted that non-terminal edge weights remain unchanged after step 228. In step 230, an indication is made that Net Zeroing was successful. Finally,in step 242, the reduced net is returned for determination of the min cut solution.

In other words, for each nonterminal node 182 connected to all terminal nodes 196, 198 and 200, let c be the smallest amount of communication represented by edges 216, 218 between an un-hosted component A on non-terminal node 182 and components hosted on a machine at terminal nodes 198 or 200, where the minimum is taken over the set of machines that communicates with the components in the independent net 180 containing A at node 182. Then, subtracting c from the amount of communication between A at node 182 and each of the machines at terminal nodes 196, 198, 200 in the set does not change the min cut solution, but simplifies arriving at that solution.

So, the preferred embodiment, the min cut step 170 is used iteratively, wherein Net Zeroing as described herein, is used to reduce independent nets in combination with the Machine Cut reduction method of U.S. patent application Ser. No. 09/676,423 entitled "MACHINE CUT TASK IDENTIFICATION FOR EFFICIENT PARTITION AND DISTRIBUTION" to Rajan et al.; U.S. patent application Ser. No. 09/676,424 entitled "DOMINANT EDGE IDENTIFICATION FOR EFFICIENT PARTITION AND DISTRIBUTION" to Wegman et al., both filed coincident herewith, assigned to the assignee of the present invention and incorporated herein by reference. Further, as independent nets are reduced, those reduced nets are further checked as in step 168 above to determine if they may be divided into simpler independent nets. Then, the Net Zeroing method of the preferred embodiment is again applied to those simpler independent nets, along with the Machine Cut method and Dominant Edge method, if necessary. To reach a solution more quickly, on each subsequent pass, only nodes and edges of a subgraph that were adjacent to areas reduced previously are rechecked. Thus, the communication graph is simplified by eliminating edges to reach a min cut solution much quicker and much more efficiently than with prior art methods.

The reduction method of the preferred embodiment reduces the number of independent components in the communication graph of a complex program. In the best case, an appropriate allocation of every component in the program is provided. However, even when best case is not achieved, the preferred embodiment method may be combined with other algorithms and heuristics such as the branch and bound algorithm or the Kernighan-Lin heuristic to significantly enhance program performance. Experimentally, the present invention has been applied to communication graphs of components in several programs with results that show significant program allocation improvement, both in the quality of the final solution obtained and in the speed in reaching the result.

Although the preferred embodiments are described hereinabove with respect to distributed processing, it is intended that the present invention may be applied to any multi-task project without departing from the spirit or scope of the invention. Thus, for example, the task partitioning and distribution method of the present invention may be applied to VLSI design layout and floor planning, network reliability determination, web pages information relationship identification, and "divide and conquer" combinatorial problem solution approaches, e.g., "the Traveling Salesman Problem."

While the invention has been described in terms of preferred embodiments, those skilled in the art will recognize that the invention can be practiced with modification within the spirit and scope of the appended claims.

What is claimed is:

1. A task management method for determining optimal placement of task components, said method comprising:
   a) generating a communication graph representative of a task, task components represented as nodes of said communication graph and edges connecting ones of said nodes, said edges representing communication between connected nodes and being weighted proportional to communication between connected nodes;
   b) assigning terminal nodes to said communication graph;
   c) identifying nodes adjacent to terminal nodes and connected to each adjacent terminal node by a terminal edge;
   d) reducing the weight of each terminal edge for each said identified node by the minimum weight of every terminal edge for said identified node;
   e) determining a min cut solution for said communication graph; and
   f) placing task components on said terminal nodes responsive to said min cut solution.

2. A task management method as in claim 1, after the step (b) of assigning terminal nodes, further comprising the step of:
   b1) identifying independent nets in said communication graph, each of said independent nets being connected between a plurality of said terminal nodes.

3. A task management method as in claim 2, wherein the step (c) of identifying nodes comprises the steps of:
   i) identifying nodes that are adjacent to each of said plurality of terminal nodes;
   ii) selecting nodes from said identified nodes, terminal edges connected to said selected nodes having a weight greater than zero;
   iii) identifying the minimum terminal edge weight for each said selected node; and
   iv) reducing weights of all terminal edges of each selected node by its corresponding identified minimum.

4. A task management method as in claim 3, wherein each said task component is a unit of the computer program.

5. A task management method as in claim 4, wherein said each computer program unit is an instance of an object in an object oriented program.

6. A task management method as in claim 4, wherein in step (d) computer program units are placed on computers, computer program units being placed on a common computer being combined into a single component.

7. A task management method as in claim 3, wherein said task is integrated circuit chip functional element placement and said task components are logic elements, said logic elements being placed on an integrated circuit chip in placement step (f).

8. A distributed processing system for determining optimal placement of computer program components on multiple computers, said distributed processing system comprising:
   means for generating a communication graph of nodes interconnected by edges and representative of a computer program, computers executing said computer program being represented as terminal nodes, computer program components being represented as non-terminal nodes and edges connecting ones of said non-terminal nodes, said edges representing communication between connected nodes and being weighted proportional to communication between connected nodes;
   means for identifying non-terminal nodes connected to terminal nodes;
   means for identifying a minimum terminal edge weight;
   means for reducing terminal edge weights responsive to said identified minimum weight;
   means for determining a min cut solution for said communication graph; and
   means for placing program components on ones of said computers responsive to said determined min cut solution;
   said computer program being executed by said computers.

9. A distributed processing system as in claim 8, further comprising:
   means for identifying independent nets connected between a plurality of said terminal nodes.

10. A distributed processing system as in claim 9, wherein said means for identifying non-terminal nodes connected to terminal nodes identifies non-terminal nodes connected to all terminal nodes connected to an independent net.

11. A distributed processing system as in claim 10, wherein each said program component is a unit of the computer program.

12. A distributed processing system as in claim 11, wherein said each program unit is an instance of an object in an object oriented program.

13. A computer program product for determining optimal placement of functional components, said computer program product comprising a computer usable medium having computer readable program code thereon, said computer readable program code comprising:
   computer readable program code means for generating a communication graph of nodes interconnected by edges and representative of a function, said nodes including a plurality of terminal nodes, functional components being represented as non-terminal nodes, said edges representing communication between connected nodes;

computer readable program code means for identifying non-terminal nodes connected to terminal nodes;

computer readable program code means for identifying a minimum terminal edge weight;

computer readable program code means for reducing terminal edge weights responsive to said identified minimum weight;

computer readable program code means for determining a min cut solution for said communication graph; and computer readable program code meow for placing program components on said terminal nodes responsive to said determined min cut solution.

14. A computer program product as in claim 13, further comprising:

computer readable program code means for identifying independent nets connected between a plurality of said terminal nodes.

15. A computer program product as in claim 14, wherein the computer readable program code means for identifying non-terminal nodes connected to terminal nodes identifies non-terminal nodes connected to all terminal nodes connected to an independent net.

16. A computer program product as in claim 15, wherein said function is a computer program and each said functional component is a unit of the computer program.

17. A computer program product as in claim 16, wherein each said program unit is an instance of an object in an object in an object oriented program.

18. A computer program product as in claim 15, wherein said function is an integrated circuit chip functional placement and each said functional component is a logic element.

* * * * *